J. C. CARROLL.
EGG CONTAINER.
APPLICATION FILED MAY 9, 1916.

1,202,671.

Patented Oct. 24, 1916.

Inventor
J. C. CARROLL
By
Attorney

UNITED STATES PATENT OFFICE.

JOHN C. CARROLL, OF TUOLUMNE, CALIFORNIA.

EGG-CONTAINER.

1,202,671.　　　　　　Specification of Letters Patent.　　Patented Oct. 24, 1916.

Application filed May 9, 1916.　Serial No. 96,312.

*To all whom it may concern:*

Be it known that I, JOHN C. CARROLL, a citizen of the United States, residing at Tuolumne, in the county of Tuolumne, State of California, have invented a new and useful Egg-Container; and I do hereby declare the following to be a full, clear, and exact description of the invention, such as will enable others skilled in the art to which it appertains to make and use the same.

The present invention relates to a device adapted to be used for the preservation of eggs, and more particularly to a novel form of rack for supporting the eggs in a container and holding them in a spaced relation to each other, the object of the invention being to provide a rack of this character which can be advantageously used for supporting the eggs when the latter are preserved in a liquid medium such as water glass.

Further objects of the invention are to provide an egg supporting rack which is simple and inexpensive in its construction, which admits of the full capacity of the container being utilized for the reception of the eggs, which can be easily and quickly assembled in operative position within the container, and which admits of large numbers of eggs being handled without danger of breakage.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 2:
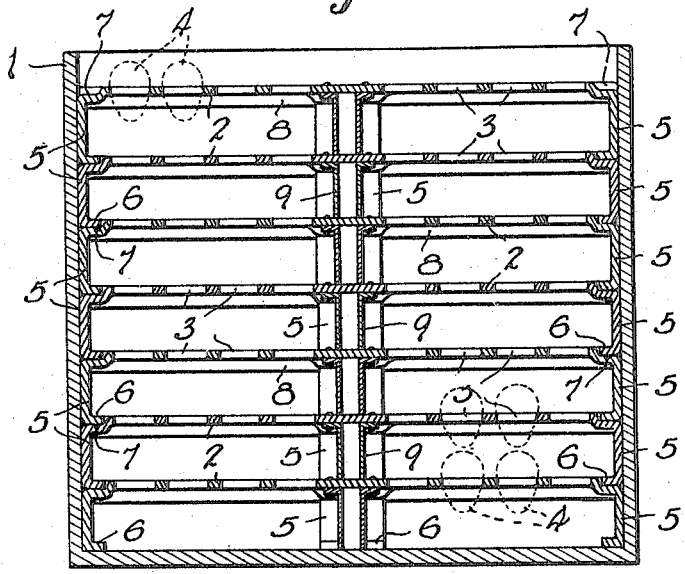
Figure 1:
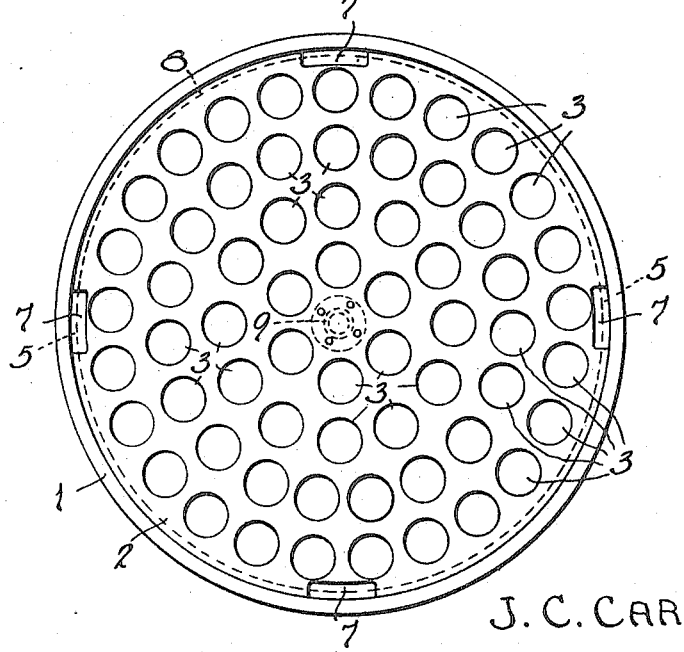

Figure 1 is a top plan view of a container provided with an egg supporting rack constructed in accordance with the invention. Fig. 2 is a vertical sectional view through one of the egg supporting plates.

Corresponding and like parts are referred to in the following description and indicated in all the views of the drawings by the same reference characters.

Referring to the drawings, which illustrate one embodiment of the invention, the numeral 1 designates a receptacle or container which may be filled with water glass or a like fluid medium, and within which the eggs or other articles are to be supported in a spaced relation to each other. The container 1 may be of any suitable shape or size, although it is preferably cylindrical in shape, as shown.

Assembled within the container 1 in a superposed relation to each other is a series of spaced egg supporting plates 2, said plates conforming in size and shape to the container 1. These plates 2 are shown as having a circular formation, and as just slightly smaller than the interior of the container 1 so as to be readily placed in position within the same or removed therefrom. Each of the plates 2 is provided with a series of concentric rows of openings 3 for the reception of the eggs 4, and the various plates 2 are supported in a spaced relation to each other by means of legs 5 which project downwardly from the peripheries of the respective plates at suitable intervals. In the present instance each of the plates 2 is provided with four of the depending legs 5, said legs being integral with the plates, and being spaced 90° apart. The plate 2, together with the legs 5, can be stamped from a single piece of sheet metal, and the legs then bent downwardly at right angles to the plate. The lower end of each of the legs 5 terminates in an inwardly extending foot 6 which obtains a firm bearing upon the next lower plate and prevents the leg from becoming wedged between the edge of the next lower plate and the walls of the container. If desired, depressions or seats 7 may be formed in the upper surface of each egg supporting plate 2 at the periphery thereof, said seats 7 being of a proper size and being properly positioned to receive the feet 6 of the superposed plate, thereby tending to lock the plates against relative rotation and to retain the same against unnecessary jarring and vibration within the container.

In filling the container the various plates 2 are filled with eggs and successively lowered into position within the container, the feet 6 of each plate being caused to engage the peripheral seats 7 of the preceding plate. The full capacity of the container may thus be utilized to the greatest advantage, and a maximum number of eggs preserved with a given quantity of water glass or other preservative.

In order to prevent undue flexing of the egg supporting plates 2 an integral depending flange 8 may be provided at the periphery thereof, the said flange being bent downwardly and formed in substantially the same way in which the supporting legs 5 are formed. To further support the plates in the container and prevent sagging at the center thereof, each of the plates may be provided with centrally disposed posts 9 which project downwardly from the bottom of the plate and are adapted to rest upon the upper surface of the next lower plate, the lowermost post being adapted to rest upon the bottom of the container.

Having thus described the invention, what I claim as new and desire to secure by Letters Patent, is:—

1. A device for preserving eggs and the like, including a container of a uniform cross section, a series of superposed and interchangeable egg supporting plates corresponding in configuration to the cross section of the container and fitted removably therein, each of the plates being provided at the periphery thereof with a series of depressed seats and also with a corresponding series of downwardly extending legs, the legs of each upper plate being adapted to engage the depressed seats of the next lower plate to hold the plates in a spaced relation and against relative rotation when assembled within the container.

2. A device for preserving eggs and the like, including a container of a uniform cross section through its depth, a series of superposed and interchangeable egg supporting plates having a configuration corresponding to the cross section of the container and fitted removably within the container, each of the plates being provided at the periphery thereof with a series of depressed seats and a corresponding series of downwardly extending legs, the legs of each upper plate being adapted to engage the depressed seats of the next lower plate to hold the plates in spaced relation and against relative rotation when the plates are assembled within the container, and a post projecting downwardly from the center of each plate for engagement with the bottom of the container or the next lower plate.

3. A device for preserving eggs and the like, including a container having a uniform cross section through its depth, a series of superposed and interchangeable egg supporting plates having a configuration corresponding to the cross section of the container and fitted removably within the container, each of the plates being surrounded by an annular reinforcing flange and provided at its periphery with a series of depressed seats and a corresponding series of downwardly extending legs, the legs of each upper plate being adapted to engage the depressed seats of the next lower plate to hold the plates in a properly spaced relation and against relative rotation.

In testimony whereof I have signed my name to this specification in the presence of two subscribing witnesses.

JOHN C. CARROLL.

Witnesses:
JOHN BATES,
IVAR EKMAN.

Copies of this patent may be obtained for five cents each, by addressing the "Commissioner of Patents, Washington, D. C."